United States Patent
Bhatia et al.

[11] Patent Number: 5,882,618
[45] Date of Patent: Mar. 16, 1999

[54] PROCESS FOR CYANIC ACID PRODUCTION

[75] Inventors: Sandeep Bhatia, Willowbrook, Ill.; Metin Gezer, Houston, Tex.

[73] Assignee: Air Liquide America Corporation, Houston, Tex.

[21] Appl. No.: 845,849

[22] Filed: Apr. 28, 1997

[51] Int. Cl.$^6$ ................................ C01C 3/02; C01C 3/08
[52] U.S. Cl. ........................................ 423/376; 423/379
[58] Field of Search ...................................... 423/376, 379

[56] References Cited

U.S. PATENT DOCUMENTS

| | | |
|---|---|---|
| 2,006,981 | 7/1935 | Andrussow . |
| 3,104,945 | 9/1963 | Jenks et al. . |
| 4,107,278 | 8/1978 | Wang ....................................... 423/376 |
| 4,521,395 | 6/1985 | Kuechler et al. . |
| 4,847,062 | 7/1989 | Rogers et al. ........................... 423/379 |
| 5,356,213 | 10/1994 | Arpentinier . |
| 5,360,603 | 11/1994 | Drnevich et al. ........................ 423/376 |

FOREIGN PATENT DOCUMENTS

| | | |
|---|---|---|
| 1005049 | 3/1957 | Germany . |
| 1288575 | 2/1969 | Germany ................................ 423/376 |
| 1283209 | 7/1969 | Germany . |
| 723081 | 2/1955 | United Kingdom ..................... 423/376 |
| 1120237 | 7/1968 | United Kingdom ..................... 423/376 |

*Primary Examiner*—Wayne Langel
*Attorney, Agent, or Firm*—Burns, Doane, Swecker & Mathis, L.L.P.

[57] ABSTRACT

Provided is a process for the production of hydrogen cyanide by reacting methane, ammonia and oxygen in the presence of a catalyst. The process, more specifically, comprises first establishing a temperature for the catalyst in the reaction using air as a source for oxygen. This essentially establishes the gauze temperature of the plant. Additional oxygen is then provided to the reaction to provide oxygen enrichment of the reaction feed, while also adjusting the amount of ammonia and methane reactants in the reaction feed such that the volume percent of the ammonia and methane is above the upper flammability limit and the temperature of catalyst is maintained within 50° C. of the temperature of the catalyst originally established as the fixed gauze temperature of the plant. The process of the present invention allows one to increase production of hydrogen cyanide while maintaining safe operation and not sacrificing catalyst performance in return. In particular, the process of the present invention has applicability to existing plants which need to be improved with regard to hydrogen cyanide production. The process would allow one to take the existing plant, optimize production, capacity and selectivity, while operating safely without adversely affecting catalyst performance.

17 Claims, 1 Drawing Sheet

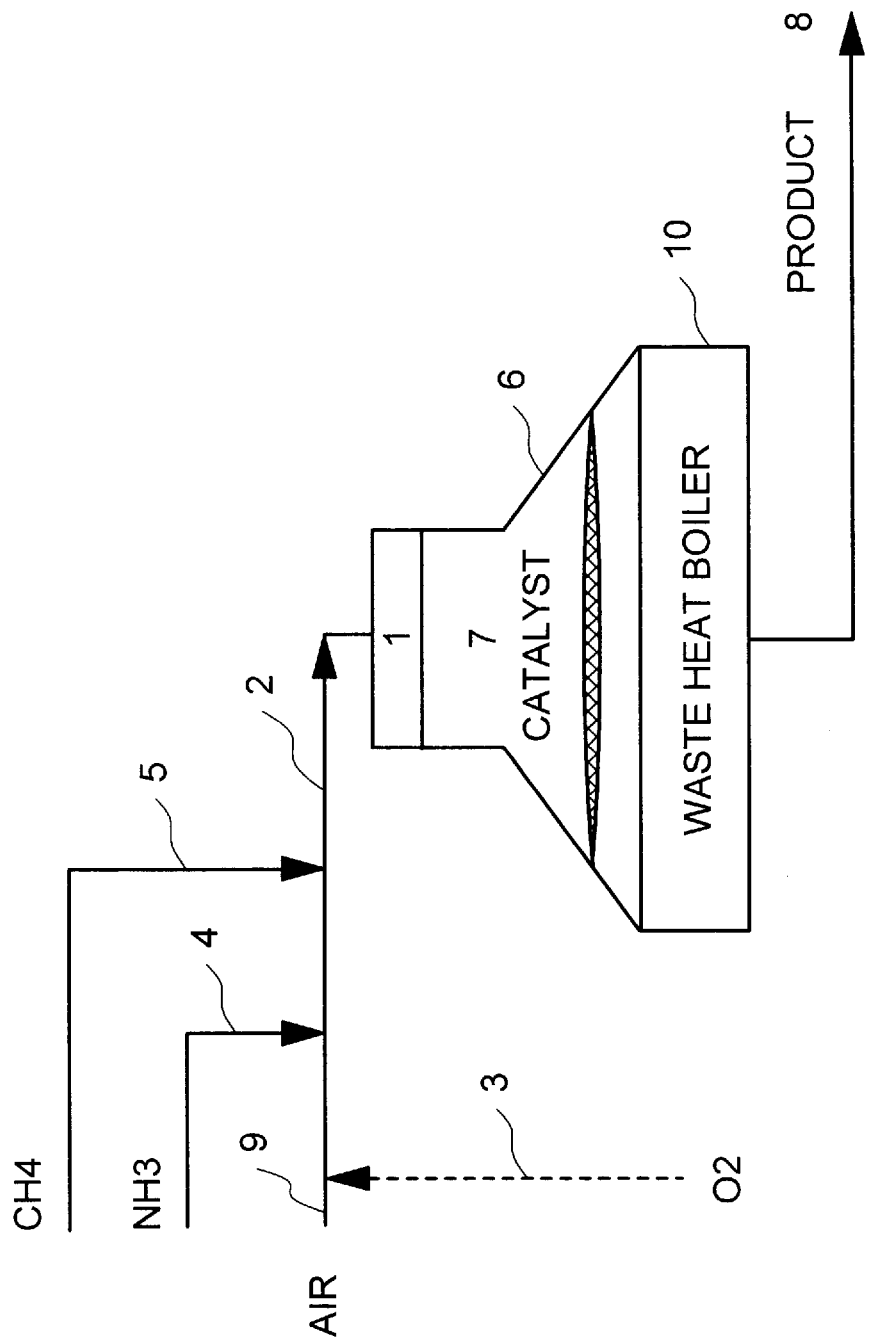
FIGURE

PROCESS FOR CYANIC ACID PRODUCTION

BACKGROUND OF THE INVENTION

1. Field of the Invention

The present invention relates to the production of hydrogen cyanide by reacting methane, ammonia and oxygen in the presence of a catalyst. More particularly, the process of the present invention relates to the use of an oxygen enriched gas mixture to safely increase the production of hydrogen cyanide in an air based production unit while not sacrificing catalyst performance.

2. Brief Description of the Prior Art

Hydrogen cyanide is generally manufactured by the Andrussow process by reacting the feed streams of air, natural gas, and ammonia over precious metal catalysts in gauze form. A description is provided, for example, in the Kirk-Othmer Encyclopedia of Chemical Technology, Fourth Edition, Volume 7, pages 753 to 782. Natural gas and $NH_3$ are each usually fed in slight stoichiometric excess to air and some degree of preheat is generally used. The feed gases to the converter are thoroughly premixed. There are two important considerations to determine the process feed mixture composition.

First, the feed gas mixture is maintained above the upper flammability limit (UFL) to prevent the mixture from entering the explosive range. The flammability limits of individual combustible gases present in the reaction mixture can be determined by LeChatelier's empirical method:

Flammability Limit=$1/\Sigma(f/L_i)$, where f=relative mole faction of flammable gases without oxygen or inert, and $L_i$=flammability limit of individual flammable component i.

Using LeChatelier's formula, the upper flammability limit of a gas mixture can be calculated in air and in oxygen, and can be used to map the entire flammable domain for a particular gaseous mixture.

Second, the feed mixture is adjusted to maximize the selectivity of HCN. If insufficient air is provided, the catalyst can become inactivated by carbon deposits. However, increasing the air to ($CH_4+NH_3$) mole ratio can move the gas mixture close to the upper flammability limit.

The overall reaction to form hydrogen cyanide is represented by $$CH_4+NH_3+1.5O_2 \rightarrow HCN+3H_2O$$

The reaction pressure is generally from 1 to 3 atm. and the temperature is generally from about 1100° C. to 1200° C. Lower temperatures may lead to carbon formation, which reduces reactivity and can cause mechanical break up of the gauze. The yield based on $NH_3$ feed is typically above 60%. Unconverted $NH_3$ is recovered from the product gas. Traces of iron contamination on the platinum catalyst reduces yield and hence promotes coke deposition. Platinum losses in the reaction are small because formation of volatile platinum oxides is less likely in the overall reducing environment.

The reactions taking place in the process are much more complex than represented by the overall reaction above. The oxygen (in the feed air stream) oxidizes a portion of the methane, making the overall reaction exothermic. Most of the heat required for hydrogen cyanide formation is supplied by combustion of methane. The reaction of methane with ammonia to form hydrogen cyanide is endothermic and produces hydrogen which is partially oxidized. However, the oxidation of the hydrogen is not complete so that the product gas also contains appreciable amounts of $H_2$ and CO as well as unreacted $NH_3$ and a small amount of $CH_4$ in addition to $N_2$ from the air.

Oxygen enrichment of air allows an increased throughput of ammonia and natural gas feed that leads to higher production capacity. However, enriching air with oxygen leads to a change in the ratios of combustibles, oxygen, and inerts thereby changing the upper flammability limit of the mixture. This requires an adjustment in process operating conditions of feed ratios. Further, the feed ratios must be adjusted to maximize the cyanide yield.

U.S. Pat. No. 3,104,945 discloses the use of oxygen enriched air in the production of hydrogen cyanide. The ratio of methane to ammonia in the initial gas mixture may vary in the range of 0.8:1 to 1.3:1 in the disclosed process. This means the ammonia-air ratio is from 0.1 to 0.26 or the ammonia-oxygen ratio is from 0.48 to 0.24 (when using 21% oxygen in air). The air to ammonia ratio ranges from 3.9:10. The preheat temperature in the gas mixture ranges from 400° to 525° C.

German Patent 1,282,209 also discloses the use of oxygen enriched air in the production of hydrogen cyanide. The patent further suggests that when using the enriched gas mixture, one should remain outside the flammability limits. The oxygen enriched levels are from 24.5 to 40% $O_2/(O_2+N_2)$ The lab scale experiments disclosed were run with a preheat temperature of 110° C. and a catalyst temperature ranging from 1100° to 1200° C.

While the use of oxygen enrichment of air in the production of hydrogen cyanide has been disclosed, it is important to understand that oxygen enrichment of a gas mixture of air, ammonia and methane can bring the mixture closer to flammability limits if the volume percent of the combustibles (ammonia and methane) are not changed. Furthermore, oxygen enrichment can lead to increased catalyst temperature if the ammonia/oxygen and methane/oxygen ratios are not changed appropriately from the normal air based case. This can lead to adverse changes in the catalyst behavior relating to both catalyst life and conversions. Also, because of higher throughput with oxygen enrichment and higher temperatures at the catalyst gauze, a higher heat duty at the waste boiler would be required in the process. In many cases extra heat duty may not be available in the existing equipment, thereby leading to a bottleneck.

Therefore, a process which can increase the production of hydrogen cyanide by using oxygen enriched air, but which is also safe, efficient and effective, and does not adversely effect the catalyst while overcoming the foregoing problems would be useful in the industry. Such a process would allow one to take existing plants, optimizing production and capacity, as well as selectivity, but not sacrificing safety or the catalyst performance.

Accordingly, it is an object of the present invention to offer a process for the production of hydrogen cyanide with high production capacity, safe operation and continued excellent catalyst performance.

Another object of the present invention is to provide a process for the production of hydrogen cyanide which would allow one to begin with an existing plant for producing hydrogen cyanide and improving the hydrogen cyanide production safely and efficiently.

Yet another object of the present invention is to provide one with a safe process for producing hydrogen cyanide which involves the adjustment of the feed streams to the process.

These and other objects of the present invention will become apparent upon a review of the following specification and the claims appended thereto.

SUMMARY OF THE INVENTION

In accordance with the foregoing objectives, provided is a process for the production of hydrogen cyanide by reacting methane, ammonia and oxygen in the presence of a catalyst. The process, more specifically, comprises first establishing a temperature for the catalyst in the reaction using air as a source for oxygen. This essentially establishes the gauze temperature of the plant. Additional oxygen is then provided to the reaction to provide oxygen enrichment of the reaction feed, while also adjusting the amount of ammonia and methane reactants in the reaction feed such that the volume percent of the ammonia and methane is above the upper flammability limit and the temperature of catalyst is maintained within 50° C. of the temperature of the catalyst originally established as the fixed gauze temperature of the plant.

In general, the fixed gauze temperature of the plant is a temperature in the range of about 1100–1200° C. For example, if the temperature of the catalyst in the process with air is 1100° C. then the oxygen enriched reaction feed will be maintained ±50° C. of 1100° C.

The process of the present invention allows one to increase production of hydrogen cyanide safely while not sacrificing catalyst performance in return. In particular, the process of the present invention has applicability to existing plants which need to be improved with regard to hydrogen cyanide production. The process would allow one to take an existing plant, optimize production, capacity and selectivity, plus operate safely without sacrificing catalyst performance.

BRIEF DESCRIPTION OF THE FIGURE OF THE DRAWING

The FIGURE of the Drawing is a schematic of a process for the production of hydrogen cyanide.

DETAILED DESCRIPTION OF THE PREFERRED EMBODIMENTS

Hydrogen cyanide is generally manufactured by reacting a feed mixture of air, natural gas and ammonia over a catalyst, which is generally a precious metal catalyst in gauze form. In establishing the process, consideration of safety (with regard to the upper flammability limit) and HCN production generally control. The established process will have or result in a catalyst temperature for that process. In most cases, this temperature ranges from 1100° C. to 1200° C. for the plant process.

Often the bottleneck to the plant capacity is the air flow rate based on the air blower capacity. This bottleneck can be removed and the throughput can be increased by enriching the feed mixture with oxygen. The addition of oxygen to the feed mixture to achieve an oxygen enrichment of the reaction feed is generally accomplished when the ratio $$\frac{O_2}{(O_2 + N_2)}$$

is increased to greater than 21%. The enrichment can be done by preferably mixing oxygen (greater than 90%) with the air stream. By suggested industrial gas handling practice guidelines, the enrichment of up to 30% $O_2/(O_2+N_2)$ can be safely done, however, enrichments of even greater percentages of $O_2/(O_2+N_2)$ can also be used, e.g., 40%, if so desired and with the proper precautions. If the $NH_3/O_2$ and $CH_4/O_2$ ratios are kept constant between the oxygen enrichment case and normal-air based operation, then the ammonia throughput can be increased as shown in Table 1.

TABLE 1

| % O2 in Air | % Increase in Ammonia Flowrate |
|---|---|
| 21 | 0 |
| 22 | 6 |
| 23 | 12 |
| 24 | 19 |
| 25 | 25 |
| 26 | 32 |
| 27 | 39 |
| 28 | 46 |
| 29 | 54 |
| 30 | 61 |

It is understood that oxygen enrichment of the feed mixture can lead to an increase in production capacity. However, for safe oxygen enrichment, the feed mixture to the reactor must be fuel rich, i.e., the fuel concentration is higher than the upper flammability limits at all times during the operation. Moreover, it has been discovered that suitable adjustments to the feed mixture to maintain same above the upper flammability limits should also be accomplished while maintaining the catalyst gauze temperature within 50° C. of the catalyst temperature for a reaction where air is a sole source of oxygen. The result is a safe process having enhanced hydrogen cyanide production, which maintains the efficiency and effectiveness of the catalyst. The increase in production, when using the process of the present invention, does not require a sacrifice of catalyst performance or safety.

Referring to the FIGURE of the drawing, there is depicted a general schematic of a process for preparing cyanic acid. In the process, a feed mixture is fed into a preheater 1 by means of a conduit 2. Into the conduit 2 is injected air via 9 and oxygen via 3 in order to have an oxygen enriched feed mixture. The remaining feed components, ammonia and methane (natural gas), are also injected into conduit 2 by means of conduits 4 and 5 respectively. The feed mixture is mixed and preheated, and then passed into the reactor 6. The reactor 6 generally contains the catalyst 7, over which the reaction to form hydrogen cyanide occurs.

In the injection of oxygen into the conduit 2, the injection can employ any known apparatus to ensure injection of a second gas into the flow of a first gas. It is preferred, however, that the injection apparatus be characterized by radial vanes which cause a deflection of the second gas to flow substantially radially into the flow of the first gas with a tangential component. Such an apparatus or injection component is described, for example, in U.S. Pat. No. 5,356,213, which is hereby incorporated by reference. The oxygen for feed mixture enrichment is preferably first mixed with air. However, the oxygen can be injected in the system by first mixing with ammonia, for example, if desired.

Once the reaction has been completed, the resulting gases are passed through a waste heat boiler 10, and then onto collection via conduit 8. The waste heat boiler is important to prevent the decomposition of ammonia and hydrogen cyanide and thus the product gases are to be quickly quenched in the waste heat boiler.

The catalyst used in the hydrogen cyanide production is generally a pad of 90% Pt–10% Rh woven screens and is supported on a ceramic structure. This structure is preferably placed directly atop a heat exchanger for rapid quenching of reaction products since HCN reacts homogeneously and rapidly with water as follows:

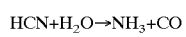

Preventing the decomposition of ammonia and hydrogen cyanide is critical. Therefore to prevent hydrogen cyanide decomposition, the converter gases are quickly quenched to <400° C. This is done in a steam generating waste-heat boiler 10, which preferably is located directly below the catalyst gauze.

In general, when one adjusts the feed mixture to practice the claimed invention, one would first generally increase the methane amount, and then the ammonia amount. This is preferred because the flammability of methane is lower than that of ammonia, so the increase would be safer. As the adjustments in the feed mixture are made, the temperature of the catalyst gauze is carefully scrutinized to maintain the temperature within 50° C. of the catalyst temperature used in a pure air based process.

In general, when adjusting the ratios of the feed mixture, the methane/ammonia ratio with oxygen enrichment is preferably in the range of from 50–98% of the methane/ammonia ratio used in the purely air case. More preferably, the ratio is within the range of from 85–96% of the methane/ammonia ratio used in the purely air case. As for the ammonia/oxygen ratio, it has been found that such a ratio is generally increased by 5–50% of the ammonia/oxygen ratio used in the purely air operation, and most preferably in the range of from 10–25% of an increase over the ammonia/oxygen ratio used in the normal air operation.

Once the appropriate adjustments have been made in the feed mixture, the hydrogen cyanide production process can then be run under conventional conditions. The process of the present invention is particularly applicable to existing plants. The existing plant would already have established a fixed gauze temperature, from which the appropriate adjustments can be made in accordance with the present invention.

When collecting the product gas, ammonia must be removed from the off-gas (or product gas) before hydrogen cyanide can be recovered, as the ammonia promotes polymerization of the hydrogen cyanide. Ammonia can be scrubbed out of the gas using sulfuric acid and producing ammonium sulfate as a by product. Alternatively, the off-gas from the converter can be passed through a solution of mono-ammonium phosphate where ammonia reacts to form a diammonium phosphate. The diammonium phosphate solution is stripped back to a monoammonium phosphate with steam and the ammonia-water overheads are fractionated under a pressure to provide ammonia gas suitable for recycle to the converter.

The ammonia free off-gas passes to an absorber for absorption of hydrogen cyanide in cold water. The dilute solution is stripped and fractionated to high purity levels. For sodium cyanide manufacturing the hydrogen cyanide vapors (or anhydrous liquid) react with sodium hydroxide, generally fed as a 50% solution. To avoid corrosion problems, all recovery equipment is constructed of austenitic stainless steel.

The invention will be illustrated in greater detail by the following specific examples. It is understood that these examples are given by way of illustration and are not meant to limit the disclosure of the claims to follow. All percentages in the Examples, and elsewhere in the specification, are by mole percent unless otherwise specified.

EXAMPLES

Air flow rate of 10,000 scfm. The mixture preheat temperature is 200° C. and pressure 1.5 bar. For the air based case the catalyst gauze temperature is assumed to be at 1100° C. Ammonia conversion to hydrogen cyanide is assumed to be 62%. Conversion of $NH_3$ to HCN is assumed constant in all cases.

The reactor is considered to be adiabatic reactor with reactions of ammonia and methane forming hydrogen cyanide, rest of the methane being combusted to provide the exothermic heat. A part of the hydrogen formed from the first reaction is also combusted and the conversion is assumed constant with oxygen enrichment. The reactor effluent are assumed to be cooled down to 400° C. to estimate the heat duty requirements of the waste heat boiler.

The new adjusted values are found by minimizing the reactor temperature based on the following constraints.

1. Temperature>T, where T is based on the temperature of reactor for the base air case. The temperature is so chosen based on the air based operation to keep the ammonia conversion to the HCN at its optimum. For example for an air base case of 1100° C. a value of T can be 1095 to 1100. A much lower value for T can lower the conversion of ammonia to hydrogen cyanide.

2. (Vol % $NH_3$+Vol % $CH_4$)>k, where the value of k is chosen based on the Upper Flammability Limit (UFL) and a preferred safety margin (0.5% to 5%), i.e., k=UFL+preferred safety margin.

In the following examples three different cases are compared.

Case 1: Air base case with a given $CH_4/NH_3$ and $CH_4/O_2$ ratio.

Case 2: Oxygen is injected into the air stream so that the $O_2/(O_2+N_2)$ ratio is 24%, 28% or 30%. $NH_3/O_2$ and $CH_4/NH_3$ ratios are kept the same as in case 1.

Case 3: $NH_3/O_2$ and $CH_4/NH_3$ ratios are altered for adjusting the process based on the method given before.

|  | Case 1 | Case 2 | Case 3 |
|---|---|---|---|
| EXAMPLE 1 | | | |
| $CH_4$, vol % | 13.8 | 15.1 | 16.3 |
| $NH_3$, vol % | 13.8 | 15.1 | 17 |
| $CH_4/NH_3$ | 1 | 1 | 0.96 |
| Combustible, vol % | 27.6 | 30.2 | 33.2 |
| UFL | 23.8 | 28.3 | 28.4 |
| $O2/(O_2 + N_2)$ | 21 | 24 | 24 |
| $NH_3/O_2$ | 0.905 | 0.905 | 1.06 |
| HNC, lb mol/hr | 186 | 221 | 260 |
| HCn, % increase |  | 19 | 40 |
| Catalyst T, C | 1100 | 1162 | 1101 |
| Duty, MMBtu/h | 27.4 | 33.1 | 32.3 |
| EXAMPLE 2 | | | |
| $CH_4$, vol % | 13 | 14.3 | 14.5 |
| $NH_3$, vol % | 14.5 | 16 | 17.5 |
| $CH_4/NH_3$ | 0.9 | 0.9 | 0.83 |
| Combustible, vol % | 27.5 | 30.0 | 32 |
| UFL | 24 | 28.6 | 28.8 |
| $O2/(O_2 + N_2)$ | 21 | 24 | 24 |
| $NH_3/O_2$ | 0.95 | 0.95 | 1.07 |
| HNC, lb mol/hr | 196 | 233 | 261 |
| HCN, % increase |  | 19 | 33 |
| Catalyst T, C | 1100 | 1163 | 1101 |
| Duty, MMBtu/h | 27.3 | 33 | 31.3 |
| EXAMPLE 3 | | | |
| $CH_4$, vol % | 14.5 | 16 | 16.2 |
| $NH_3$, vol % | 13 | 14.3 | 15.7 |
| $CH_4/NH_3$ | 1.1 | 1.1 | 1.03 |
| Combustible, vol % | 27.5 | 30.3 | 32 |
| UFL | 23.5 | 28 | 28.2 |
| $O2/(O_2 + N_2)$ | 21 | 24 | 24 |
| $NH_3/O_2$ | 0.86 | 0.86 | 0.96 |
| HNC, lb mol/hr | 176 | 209 | 235 |
| HCN, % increase |  | 19 | 34 |
| Catalyst T, C | 1100 | 1163 | 1096 |
| Duty, MMBtu/h | 27.5 | 33.2 | 31.2 |

-continued

|  | Case 1 | Case 2 | Case 3 |
|---|---|---|---|
| EXAMPLE 4 | | | |
| $CH_4$, vol % | 13.8 | 16.8 | 14.5 |
| $NH_3$, vol % | 13.8 | 16.8 | 17.5 |
| $CH_4/NH_3$ | 1 | 1 | 0.92 |
| Combustible, vol % | 27.6 | 33.6 | 38 |
| UFL | 23.8 | 33.8 | 34.1 |
| $O2/(O_2 + N_2)$ | 21 | 28 | 28 |
| $NH_3/O_2$ | 0.905 | 0.905 | 1.14 |
| HNC, lb mol/hr | 186 | 272.5 | 343 |
| HCN, % increase |  | 47 | 84 |
| Catalyst T, C | 1100 | 1234 | 1101 |
| Duty, MMBtu/h | 27.3 | 41.5 | 38.1 |
| EXAMPLE 5 | | | |
| $CH_4$, vol % | 13.8 | 17.6 | 17.7 |
| $NH_3$, vol % | 13.8 | 17.6 | 20.8 |
| $CH_4/NH_3$ | 1 | 1 | 0.85 |
| Combustible, vol % | 27.6 | 35.2 | 38.5 |
| UFL | 23.8 | 36.3 | 36.8 |
| $O2/(O_2 + N_2)$ | 21 | 30 | 30 |
| $NH_3/O_2$ | 0.905 | 0.905 | 1.13 |
| HNC, lb mol/hr | 186 | 300 | 373 |
| HCN, % increase |  | 61 | 100 |
| Catalyst T, C | 1100 | 1266 | 1096 |
| Duty, MMBtu/h | 27.3 | 46.1 | 39.2 |

From the previous examples it can be seen that if the ratio $NH_3/O_2$ and $CH_4/NH_3$ are kept the same for oxygen enriched operation, then (i) heat duty requirements increase substantially, (ii) the operating point moves closer (and in some cases in) to the flammable zone, (iii) the product yields are not optimum. An adjustment in accordance with the present invention yields higher product capacity while maintaining the operation safely outside the flammable zone.

While the invention has been described with preferred embodiments, it is to be understood that variations and modifications may be resorted to as will be apparent to those skilled in the art. Such variations and modifications are to be considered within the purview and the scope of the claims appended hereto.

We claim:

1. A process for the production of hydrogen cyanide by reacting methane, ammonia and oxygen in the presence of a catalyst, the process comprising
   (i) establishing a temperature for the catalyst in the reaction using air as a source for oxygen, and
   (ii) providing additional oxygen to the reaction to provide oxygen enrichment of the reaction feed, while also adjusting the amount of ammonia and methane reactants in the reaction feed such that the volume percent of the ammonia and methane is above the upper flammability limit, with the methane/ammonia ratio after adjustment being in the range of from about 50 to 98% of the methane/ammonia ratio used in establishing (i), and the temperature of the catalyst is within 50° C. of the temperature of the catalyst established in (i).

2. The process of claim 1, wherein the temperature of the catalyst in (i) is about 1100° C.

3. The process of claim 1, where the temperature of the catalyst after the adjustment of feed reactants is within 5 to 10° C. of the temperature of the catalyst established in (i).

4. The process of claim 1, wherein the methane to ammonia ratio after adjustment is in the range of about 85 to 96% of the methane to ammonia ratio used in establishing (i).

5. The process of claim 1, wherein the ammonia to oxygen ratio after adjustment is from 5 to 50% greater than the ammonia/oxygen ratio used in establishing (i).

6. The process of claim 5, wherein the ammonia/oxygen ratio after adjustment is from 10 to 25% greater than the ammonia/oxygen ratio used in establishing (i).

7. The process of claim 1, wherein the oxygen added is added as oxygen enriched air with the oxygen enrichment being such that the oxygen comprises about 24 volume percent of the total oxygen plus air, the sum of the ratios of methane/air plus ammonia/air is greater than 0.40.

8. The process of claim 1, wherein oxygen is added to the feed as pure oxygen.

9. The process of claim 8, wherein the oxygen is injected using an oxygen injector having radial vanes which cause a deflection of oxygen to flow substantially radially into the flow of air with a tangential component.

10. The process of claim 1, wherein the oxygen added is added as oxygen enriched air.

11. The process of claim 1, wherein the oxygen enrichment is such that the oxygen comprises up to 25 volume % of the oxygen plus air in the feed.

12. The process of claim 1, wherein the oxygen enrichment is such that the oxygen comprises up to 40 volume % of the oxygen plus air in the reaction feed.

13. The process of claim 1, wherein the oxygen enrichment is such that oxygen comprises about 24 volume percent of the oxygen plus air total.

14. A process for the production of hydrogen cyanide by reacting methane, ammonia and oxygen, in the presence of a catalyst, where air is a source for oxygen, the process comprising enriching the feed with oxygen by an amount of oxygen greater than that provided by air alone, adjusting the amount of ammonia and methane reactants in the reaction feed such that the volume % of the ammonia and methane is above the upper flammability limit, with the methane/ammonia ratio after adjustment being in the range of from about 50 to 98% of the methane/ammonia ratio prior to adjustment, and that the sum of the ratios $CH_4$/air plus $NH_3$/air is greater than 0.40 and the temperature of the catalyst is within 50° C. of the catalyst temperature for a reaction where air is the sole source of oxygen.

15. The process of claim 14, wherein the temperature of the catalyst is about 1100° C.

16. A reaction for preparing sodium cyanide which comprises reacting hydrogen cyanide with sodium hydroxide, the process comprising preparing the hydrogen cyanide by the process of claim 1, and reacting the hydrogen cyanide with sodium hydroxide.

17. A process for the production of sodium cyanide by reacting hydrogen cyanide with sodium hydroxide, the process comprising preparing the hydrogen cyanide by the process of claim 14, and reacting the hydrogen cyanide product with sodium hydroxide.

* * * * *